(12) United States Patent
Hadrath et al.

(10) Patent No.: US 9,677,720 B2
(45) Date of Patent: Jun. 13, 2017

(54) LIGHTING DEVICE COMPRISING A WAVELENGTH CONVERSION ARRANGEMENT

(71) Applicant: OSRAM GmbH, Berlin (DE)

(72) Inventors: Stefan Hadrath, Falkensee (DE); Oliver Mehl, Berlin (DE)

(73) Assignee: OSRAM GmbH, Munich (DE)

( * ) Notice: Subject to any disclaimer, the term of this patent is extended or adjusted under 35 U.S.C. 154(b) by 113 days.

(21) Appl. No.: 14/615,239

(22) Filed: Feb. 5, 2015

(65) Prior Publication Data

US 2015/0267880 A1    Sep. 24, 2015

(30) Foreign Application Priority Data

Feb. 5, 2014    (DE) .................. 10 2014 202 090

(51) Int. Cl.
| | | |
|---|---|---|
| *G03B 21/00* | (2006.01) | |
| *F21K 99/00* | (2016.01) | |
| *F21V 7/00* | (2006.01) | |
| *F21V 13/12* | (2006.01) | |
| *G03B 21/20* | (2006.01) | |
| *G03B 33/06* | (2006.01) | |

(52) U.S. Cl.
CPC .............. *F21K 9/56* (2013.01); *F21V 7/0033* (2013.01); *F21V 13/12* (2013.01); *G03B 21/204* (2013.01); *G03B 33/06* (2013.01)

(58) Field of Classification Search
CPC .............. G03B 21/2033; G03B 21/206; G03B 21/2066; G03B 21/28; G03B 21/204; G03B 33/06; G02B 6/29361; G02B 27/141; F21K 9/56; F21K 9/64

USPC .................... 353/84; 362/230, 231
See application file for complete search history.

(56) References Cited

U.S. PATENT DOCUMENTS

| | | | | |
|---|---|---|---|---|
| 2013/0021582 | A1* | 1/2013 | Fujita ................... | G03B 21/204 353/31 |
| 2013/0100644 | A1* | 4/2013 | Hu ............................ | F21V 7/22 362/84 |
| 2013/0176540 | A1* | 7/2013 | Wei ....................... | G03B 21/204 353/20 |
| 2013/0278902 | A1* | 10/2013 | Chen ..................... | G03B 21/204 353/31 |
| 2013/0322056 | A1* | 12/2013 | Konuma .................. | F21V 13/14 362/84 |
| 2016/0026076 | A1* | 1/2016 | Hu ....................... | G03B 21/204 353/84 |

FOREIGN PATENT DOCUMENTS

CN        102385233        3/2012

* cited by examiner

*Primary Examiner* — Julie Bannan

(74) *Attorney, Agent, or Firm* — Cozen O'Connor

(57) ABSTRACT

A lighting device comprising a phosphor wheel configured such that it temporarily sequentially not only emits the excitation light in a wavelength-converted fashion as conversion light but additionally reflects said excitation light in an unconverted fashion as reflection light. Conversion light and reflection light are guided spatially separately on a conversion light path and reflection light path, respectively, with the aid of a first dichroic mirror and are finally combined with the aid of a second dichroic mirror. In this way, it is possible to combine the reflection light for example as a blue light channel with the conversion light.

14 Claims, 7 Drawing Sheets

LIGHTING DEVICE COMPRISING A WAVELENGTH CONVERSION ARRANGEMENT

RELATED APPLICATIONS

This application claims the priority of German application no. 10 2014 201 090.5 filed Feb. 5, 2014, the entire content of which is hereby incorporated by reference.

FIELD OF THE INVENTION

The invention relates to a lighting device comprising an excitation light source and a wavelength conversion arrangement. The excitation light source emits excitation light which is converted into light in a different spectral range than the excitation light with the aid of the wavelength conversion arrangement (conversion light).

The invention is applicable, in particular, for projection devices, for example for film and video projection, in technical and medical endoscopy, for lighting effects in the entertainment industry, for medical irradiations and in the vehicle sector, in particular for headlights for motor vehicles.

BACKGROUND OF THE INVENTION

The prior art discloses lighting devices comprising a wavelength conversion element in the form of a phosphor. In this case, said lighting devices comprise an excitation light source, which excites the phosphor to emit light having a different wavelength than the excitation light wavelength. By means of suitable deflection of the excitation light and of the light emitted by the phosphor, these two light paths can be combined and fed to an optical integrator.

The document CN 102385233 A discloses a lighting device for a projector comprising an excitation laser, a phosphor wheel for the wavelength conversion of the excitation laser light into conversion light, and a filter wheel, for the spectral filtering of the conversion light. The filter wheel and the phosphor wheel are arranged on a common axis and thus rotate at the same speed. The excitation laser light is reflected onto the phosphor wheel with the aid of a dichroic mirror. By contrast, the conversion light radiated back from the phosphor wheel passes through the dichroic mirror and then impinges on the filter wheel. Through a transparency segment in the phosphor wheel, the excitation laser light can pass through the phosphor wheel without being changed spectrally and is fed to the dichroic mirror via a so-called wraparound loop and is combined with the conversion light path.

SUMMARY OF THE INVENTION

One object of the present invention is to provide an alternative combination of the light paths of the excitation light and of the wavelength-converted light.

A further object of the invention is to improve the intermixing of excitation light and wavelength-converted light.

These and other objects are attained in accordance with one aspect of the present invention directed to a lighting device for generating light by means of a wavelength conversion arrangement, comprising an excitation light source, which is designed to emit excitation light, and a wavelength conversion arrangement having at least one wavelength conversion element, which wavelength conversion arrangement is arranged in an excitation light path. The at least one wavelength conversion element is designed to at least partly convert the excitation light radiated onto the wavelength conversion element from the excitation light source into conversion light and emit the conversion light into the same half-space in which the excitation light is incident on the surface of the wavelength conversion element. The wavelength conversion arrangement is designed to reflect the excitation light radiated onto the wavelength conversion arrangement from the excitation light source at least occasionally and at least partly in an unconverted fashion as reflection light. A first dichroic mirror is arranged and designed to guide the reflection light onto a reflection light path and the conversion light onto a conversion light path, wherein the reflection light path and the conversion light path are at least partly spatially separated. A beam combining arrangement is designed for combining the reflection light coming from the reflection light path and the conversion light coming from the conversion light path.

An embodiment of the invention involves designing the wavelength conversion arrangement such that the excitation light is not just wavelength-converted (also called conversion light hereinafter for short), but is additionally and purposefully reflected at least occasionally and at least partly in an unconverted fashion, i.e. without being changed spectrally (also called reflection light hereinafter for short). In this case, both the conversion light and the reflection light are emitted into the same half-space in which the excitation light is incident on the wavelength conversion arrangement. Moreover, the lighting arrangement is designed according to the invention such that the reflection light is separated from the conversion light emitted into the same half-space and is guided onto a reflection light path. By contrast, the conversion light is guided onto a conversion light path, which is at least partly spatially separated from the reflection light path. Finally, the conversion light coming from the conversion light path and the reflection light coming from the reflection light path are united with the aid of a beam combining arrangement. The advantage of these measures is that with relatively little outlay and in particular few optical elements the reflection light can be optically shaped independently of the conversion light and thus utilized as an additional colored light channel, preferably as a blue light channel, and combined with the conversion light at the output of the lighting device. A transparency segment in the phosphor wheel and a wraparound loop as in the prior art are not necessary.

Preferably, blue light (i.e. light in the blue spectral range), in particular blue laser light, is used as the excitation light since the excitation light, besides being utilized for exciting a phosphor, can then additionally also be utilized as a blue color channel (reflection light).

The wavelength conversion arrangement of the lighting device according to an embodiment of the invention can comprise a static carrier, on which the at least one wavelength conversion element is arranged. By way of example, the wavelength conversion element can comprise a phosphor layer, which converts at least part of the incident excitation light into conversion light having a different spectrum than the excitation light and thus provides it together, that is to say simultaneously, with the unconverted excitation light. However, in this case, the excitation light is not only reflected at the surface of the phosphor layer but also scattered by the phosphor, as a result of which the efficiency of the utilization of the unconverted excitation light (e.g. blue light channel), is reduced.

Preferably, the wavelength conversion arrangement according to an embodiment of the invention is designed for temporarily sequential colored light generation. This is advantageous in particular for applications in which differently colored light is used, for example in color video projection or color effect luminaires. Preferably, the wavelength conversion arrangement is designed here such that the excitation light is utilized at least predominantly in an unconverted fashion, i.e. without being changed spectrally, during a time phase. For this purpose, the wavelength conversion arrangement can comprise at least one reflection element which at least partly reflects the excitation light. The at least one reflection element can be embodied as a mirror surface, for example. Moreover, the wavelength conversion arrangement is designed to the effect that the excitation light can be radiated onto the at least one reflection element or the at least one wavelength conversion element temporarily sequentially.

By way of example, the wavelength conversion arrangement can be embodied as a phosphor wheel, which is rotatable about a rotation axis of the phosphor wheel. In this case, the at least one wavelength conversion element can be arranged in one or a plurality of annulus segments of a ring-shaped region of the phosphor wheel that extends around the rotation axis of the phosphor wheel. For conversion light having more than one light color, a corresponding number of wavelength conversion elements are provided. By way of example, two or more phosphor segments can be arranged sequentially on the phosphor wheel. Moreover, the at least one reflection element can be arranged at least in an annulus segment of a ring-shaped region of the phosphor wheel that extends around the rotation axis of the phosphor wheel.

By way of example, a yellow phosphor can be used for the phosphor layer of a wavelength conversion element, which yellow phosphor converts the blue light into yellow light. Upon superimposition and mixing of both colored light portions, white light can be generated, the color temperature of which can be set by targeted selection of the respective portions of blue and yellow light. For sequential colored light generation, the wavelength conversion arrangement can have a red and green phosphor segment, for example. A sequence of red, green and blue light can thus be generated with the aid of a reflection element and blue light as excitation light. As necessary, other or further phosphors can also be used, for example a yellow phosphor, phosphors having different color nuances, e.g. two different red or green phosphors, etc.

It is true that without special measures, for example applying an antireflection layer on the surface of a, for example, sintered phosphor layer, a small part of the incident excitation light is already unavoidably reflected in an unconverted fashion by the surface of the usually porous phosphor layer. For a purposeful utilization, however, it is essential to increase that portion of the incident excitation light which is reflected in an unconverted fashion. Depending on the application, it may already suffice to make a phosphor layer suitably thin, namely such that the incident excitation light that penetrates into the phosphor layer is not completely converted. The remaining unconverted portion is then reflected back from the carrier on which the phosphor layer is applied. Therefore, the carrier is preferably embodied as at least partly reflective. The at least one wavelength conversion element can also be embodied as a perforated phosphor layer on the carrier. The perforation of the phosphor can be embodied as a hole grid, for example, but other forms or combinations of forms are also possible. By means of the perforation, that is to say by means of the ratio of the total perforation area to the total surface area of the phosphor, at a proportion of the incident excitation light which is reflected in an unconverted fashion can be increased further or set.

In order that the excitation light reflected in an unconverted fashion can be utilized in a practicable manner, it is expedient for the excitation light to be directed onto the surface of the wavelength conversion arrangement or of the reflection element and of the wavelength conversion element obliquely, rather than perpendicularly. In the case of oblique incidence, the excitation light (reflection light) obliquely reflected in an unconverted fashion by the wavelength conversion arrangement can be separated more easily from the excitation light radiated onto the wavelength conversion arrangement.

In order that the conversion and reflection light emitted into the same half-space can be directed onto different light paths, one of the two, for example the conversion light, is deflected from the excitation light path by a first dichroic mirror, which is arranged obliquely, preferably at 45°, with respect thereto, and specularly reflected onto the conversion light path. By contrast, the reflection light transmits through the first dichroic mirror without any significant change in direction. For this purpose, the first dichroic mirror is embodied as transmissive for the excitation light and reflective for the conversion light. Consequently, the excitation light incident on the wavelength conversion arrangement on the excitation light path can therefore also transmit through the first dichroic mirror without a change in direction.

It goes without saying that the separation of conversion and reflection light can alternatively also be carried out the other way round. For this alternative, the first dichroic mirror is embodied as reflective for the excitation light and transmissive for the conversion light, that is to say exactly the other way round compared with previously. With a dichroic mirror embodied in this way, the conversion light is transmitted onto the conversion light path and the reflection light is deflected from the excitation light path and specularly reflected onto the reflection light path. Since, in this alternative, the excitation light incident on the wavelength conversion arrangement on the excitation light path cannot transmit through the first dichroic mirror without a change in direction, the excitation light must be radiated in from the side and deflected onto the wavelength conversion arrangement reflectively via the first dichroic mirror.

The beam combining arrangement provided for combining reflection and conversion light preferably comprises a second dichroic mirror. The conversion or reflection light specularly reflected out (that is to say reflected) by the first dichroic mirror is directed onto said second dichroic mirror, which is likewise preferably arranged at 45°.

Moreover, the beam combining arrangement preferably has a deflection optical unit, which deflects the reflection light or alternatively conversion light transmitted through the first dichroic mirror onto the second dichroic mirror. For this purpose, the deflection optical unit has, for example, two deflection mirrors spaced apart from one another, which are arranged optically downstream of the first dichroic mirror successively such that the light transmitted through the first dichroic mirror is deflected via an e.g. oppositely U-shaped deflection light path onto the second dichroic mirror and transmits through the latter. The second dichroic mirror is therefore designed likewise to reflect the light reflected by the first dichroic mirror and likewise to transmit the light transmitted by the first dichroic mirror.

Moreover, the abovementioned optical elements of the lighting device are arranged and designed such that the light transmitted by the first dichroic mirror and subsequently deflected and the light reflected by the first dichroic mirror are combined with the aid of the second dichroic mirror. In this case, the light beams of reflection light and conversion light downstream of the second dichroic mirror in the propagation direction can at least partly overlap or else be offset collinearly or parallel. Moreover, the propagation directions of the two light beams can form a small angle with respect to one another.

Preferably, the excitation light is focused onto the wavelength conversion arrangement, i.e. the at least one wavelength conversion element or, if appropriate, the at least one reflection element, with the aid of a collecting optical unit. The collecting optical unit additionally serves to collect and collimate the conversion light emitted by the wavelength conversion arrangement or the reflection light (excitation light reflected in an unconverted fashion).

In order to cause the excitation light to impinge on the surface of the wavelength conversion arrangement obliquely, the preferably at least approximately collimated excitation light can also be radiated onto the collecting optical unit for example parallel and offset with respect to the optical axis (off-axis). The collecting optical unit refracts all incident off-axis parallel rays in the direction of the focus of the collecting optical unit and thus obliquely onto the surface of the wavelength conversion arrangement. The at least one reflection element reflects these light rays just as obliquely in an unconverted fashion and the collecting optical unit collimates them correspondingly parallel and offset with respect to the optical axis. Further details in this respect are found in the exemplary embodiments.

For mixing the reflection light and the conversion light it is advantageous for the light beams combined by means of the second dichroic mirror to be directed into an optical integrator by means of a second collecting optical unit disposed optically downstream. The optical integrator homogenizes the incident light beams, for example by multiple reflection on the way from the integrator input to the integrator output.

A further improvement in the mixing and, if appropriate, the reduction of coherence effects (speckle) are possible with the aid of an optical diffuser optionally arranged between the two deflection mirrors.

In addition to the mixing of the reflection light and the conversion light in the near field, it is advantageous for mixing in the far field to direct the reflection light onto the second collecting optical unit parallel and offset with respect to the optical axis (off-axis). In the propagation direction the reflection light beam overlaps the generally wider conversion light beam asymmetrically at one side thereof. The second collecting lens then refracts the light beams incident parallel and offset into the focus of the collecting lens. This makes it possible to adapt the divergence of the focused reflection light beam to the focused conversion light beam during coupling into the optical integrator.

An even better adaptation of the angular distribution of the focused reflection light beam to the focused conversion light beam can also be carried out by the diameter of the reflection light beam being adapted to the diameter of the conversion light beam by expansion. For this purpose, an expanding optical telescope can be arranged between the two deflection mirrors.

Preferably, the excitation light source comprises at least one laser diode. In order to be able to provide the high excitation light power required for many applications, it can be advantageous to fit a plurality of laser diode chips in a common housing. Each laser diode can be equipped with at least one dedicated and/or common optical unit (multi-lens array) for beam guiding, e.g. at least one Fresnel lens, collimator, and so on. Other excitation light sources are also conceivable, such as, for example, those comprising super-luminescent diodes, LEDs, organic LEDs and the like.

BRIEF DESCRIPTION OF THE DRAWINGS

The invention will be explained in greater detail below on the basis of exemplary embodiments. In the figures.

DETAILED DESCRIPTION OF THE DRAWINGS

Features that are identical or of identical type may also be provided with identical reference signs hereinafter for the sake of better clarity.

Figure 1A:
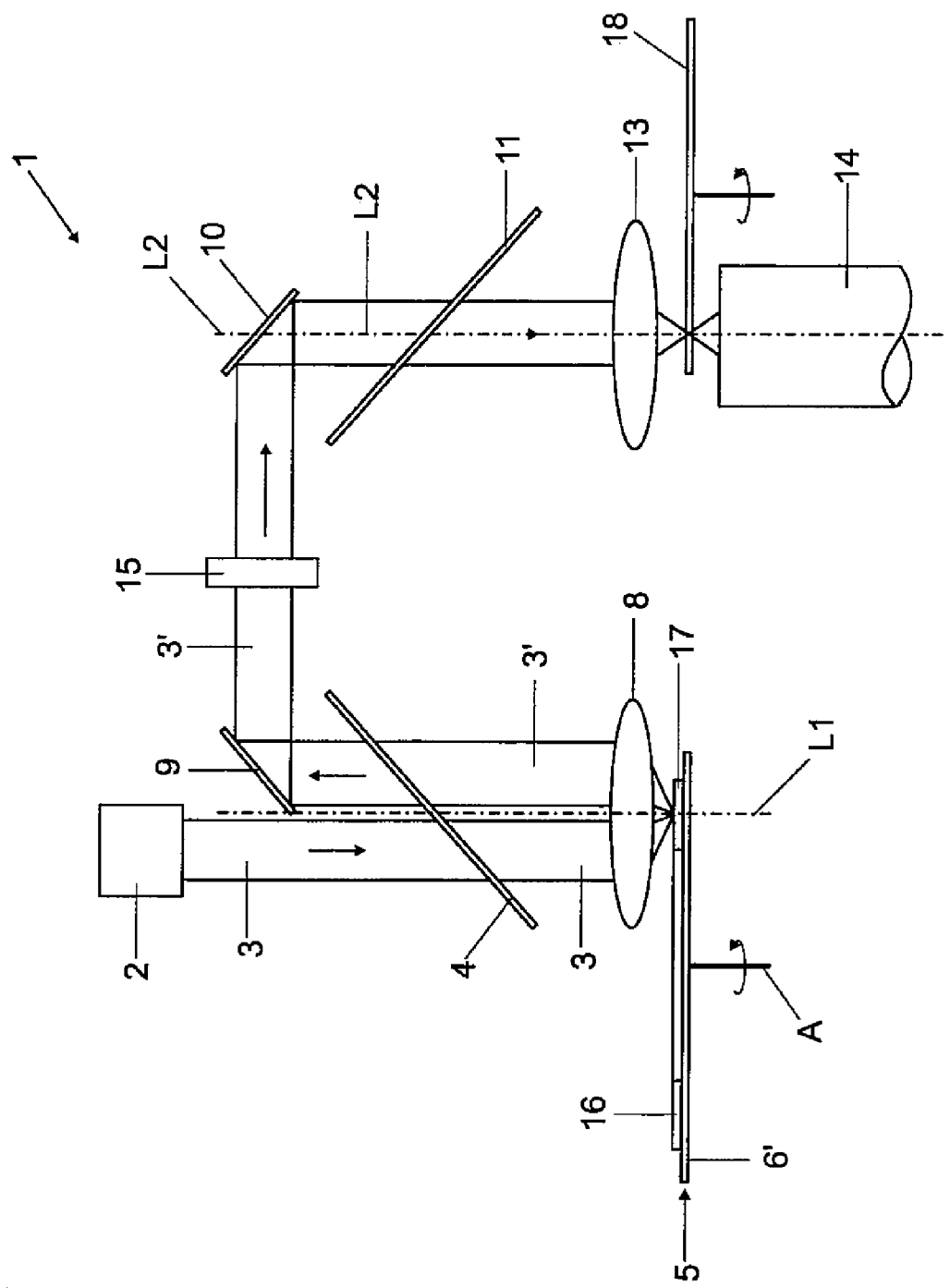
FIG. 1a shows one exemplary embodiment of a lighting device according to the invention with phosphor wheel in a first phase.

FIG. 1a shows a schematic illustration of a lighting device 1 in accordance with one exemplary embodiment of the invention. The lighting device 1 comprises an excitation light source 2 embodied as a laser device. The laser device can be embodied for example as a laser diode matrix comprising a plurality of laser diodes. For further details in this respect, reference is made to FIG. 5 and the associated description of the figures. The excitation light 3 is also concomitantly utilized as a blue color channel. Therefore, the excitation light source 2 is designed to emit excitation light 3 in the blue spectral range, for example in the range of 440-470 nm, particularly preferably at approximately 450 nm. Moreover, this is a suitable excitation wavelength for many phosphors.

The preferably at least approximately collimated blue laser light 3 from the excitation light source 2 is directed through a first dichroic mirror 4 onto a wavelength conversion arrangement, which is embodied as a phosphor wheel 5. The phosphor wheel 5 comprises a circular-disk-shaped carrier 6 mounted rotatably about the rotation axis A. On the side facing the excitation light source 2, the carrier 6 is provided with three annulus segments, a red phosphor segment 16, a green phosphor segment (not discernible) and a mirror segment 17. The mirror segment 17 can be embodied for example by a segment of the preferably reflectively coated surface of the carrier 6, said segment not being coated with phosphor. The lighting device 1 is therefore provided for a temporarily sequential sequence of red, green and blue light. It is suitable for example as a temporarily sequential colored light source in a video projector. Furthermore, further or other phosphor segments can also be provided as necessary, for example additionally a yellow phosphor layer.

The blue laser light 3 is focused onto that surface of the phosphor wheel 5 which faces the incident excitation light 3 with the aid of a first collecting optical unit 8, which is arranged between the first dichroic mirror 4 and the phosphor wheel 5. In this case, excitation light source 2 and first collecting optical unit 8 are adjusted relative to one another such that the blue laser light 3 (symbolized by an arrow) is incident on the first collecting optical unit 8 parallel and displaced with respect to the optical axis L1 of said collecting optical unit (off-axis beam path).

FIG. 1a illustrates that temporal phase during which the mirror segment 17 of the phosphor wheel 5 rotates through the focus of the blue laser light 3. During this reflection phase, the incident blue laser light 3 is reflected back in an unconverted fashion from the mirror segment 17 of the phosphor wheel 5. The reflected laser light 3' (reflection light) is directed back in a collimated fashion through the first collecting optical unit 8 in a manner mirror-inverted with respect to the incident blue laser light 3 and passes through the first dichroic mirror 4. The blue reflection light 3' is then deflected onto a second dichroic mirror 11 with the aid of a deflection optical unit consisting of two deflection mirrors 9, 10, said second dichroic mirror being designed to be transparent to the blue laser light or reflection light 3' in the same way as the first dichroic mirror 4. The second dichroic mirror 11 transmits the deflected reflection light 3', which is focused into an optical integrator 14 by the second collecting optical unit 13. In this case, the second deflection mirror 10 and the second collecting optical unit 13 are adjusted relative to one another such that the blue laser light 3' (once again symbolized by an arrow) is incident on the second collecting optical unit 13 on the optical axis L2 of said second collecting optical unit (on-axis beam path). The optical integrator 14 is, for example, a suitable glass rod which mixes the blue and yellow light to form white mixed light on the basis of multiple total internal reflection.

Instead of or in addition to an optical integrator 14, provision can also be made of other optical elements for the light mixing. A diffusely scattering element 15 (diffuser) optionally arranged between the two deflection mirrors 9, 10 serves for better mixing of the two light portions after passing through the integrator and the reduction of coherence effects (speckle).

The two deflection mirrors 9, 10 and the two dichroic mirrors 4, 11 are tilted in a common plane in each case by 45° relative to the respective optical axis. Angles deviating therefrom can also be set, as long as this merely affects the geometrical arrangement of the individual optical elements and not the fundamental function of the arrangement.

A filter wheel 18 arranged between the second collecting optical unit 13 and the optical integrator 14 serves to improve the color purity of the respective colored conversion light (e.g. red, green, yellow, etc.). For this purpose, it has color filter segments corresponding to and synchronized with the phosphor segments of the phosphor wheel 5 (not illustrated). During the reflection phase, a segment that leaves the blue light spectrally unchanged rotates through the focus of the second collecting optical unit 13.

Figure 1B:
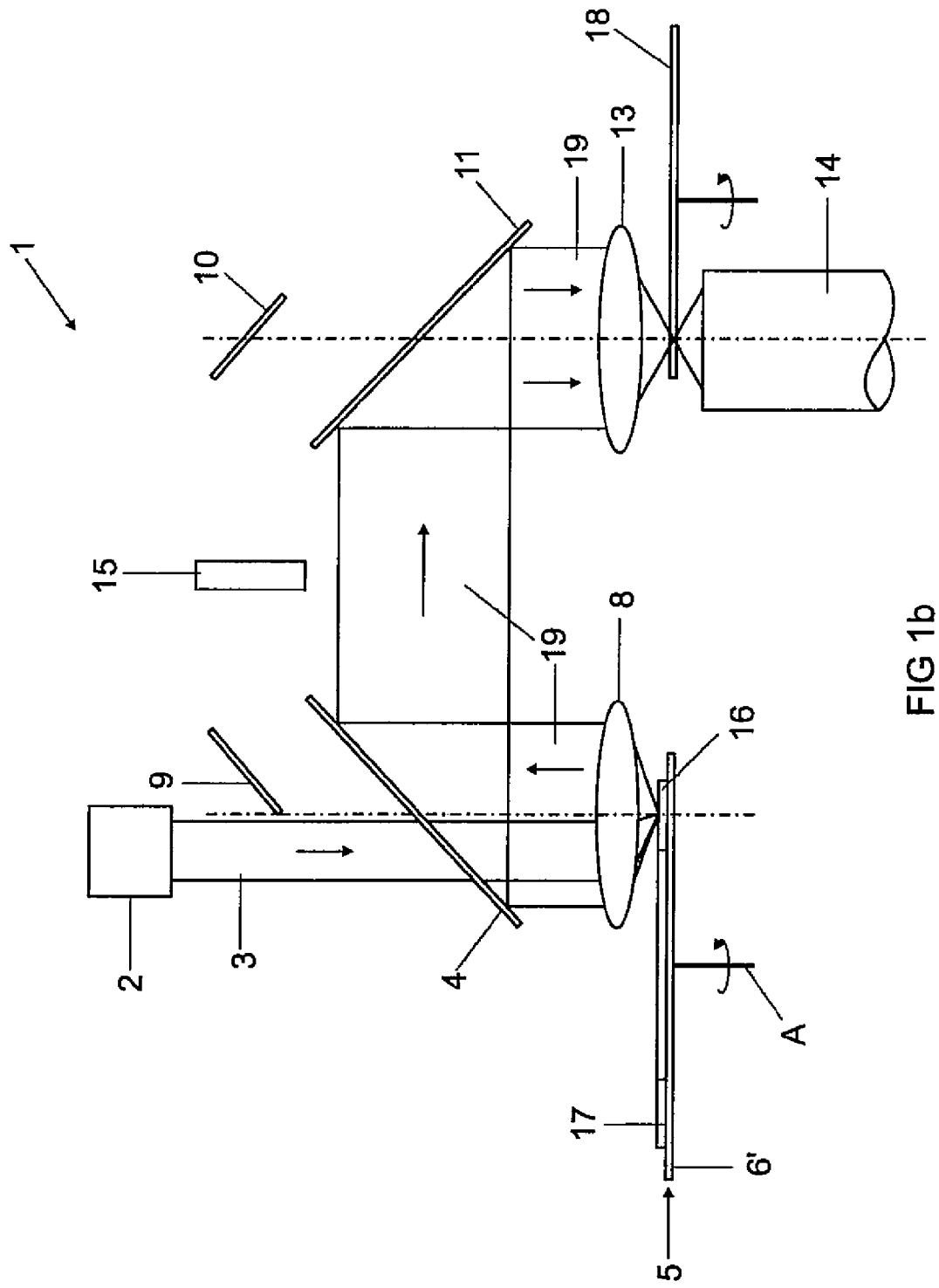
FIG. 1b shows the exemplary embodiment from FIG. 1a in another light phase.

FIG. 1b illustrates that temporal phase of the lighting device 1 during which the red phosphor segment 16 of the phosphor wheel 5 rotates through the focus of the blue laser light 3. The phosphor wheel 5 has therefore correspondingly rotated further relative to the reflection phase illustrated in FIG. 1a. During the phase illustrated in FIG. 1b, the laser light 3 is converted into conversion light in the red spectral range by the red phosphor of the red phosphor segment 16 (also designated hereinafter as "red conversion phase" for short). The red conversion light 19 is emitted by the laser spot on the red phosphor segment 16 approximately in a Lambertian distribution, is collected by the first collecting optical unit and is directed onto the first dichroic mirror 4 in a collimated fashion, from where it is spectrally reflected onto the second dichroic mirror 11, which, like the first dichroic mirror 4, is designed as transparent only to the blue laser light 3, 3', but as reflective for differently colored light, in particular also for the red conversion light 19. The second dichroic mirror 11 reflects the red conversion light 19 onto the second collecting optical unit 13, which focuses the red conversion light 19 through the filter wheel into the optical integrator 14. Moreover, the red filter segment (not illustrated) of the filter wheel 18 rotates synchronously with the red phosphor segment 16 of the phosphor wheel 5. As a result, the red conversion light 19 is spectrally filtered by the red filter segment simultaneously rotating through the focus of the second collecting optical unit 13 and the color purity of the red light channel is improved in the process.

In the "green conversion phase", i.e. when the green phosphor segment of the phosphor wheel 5 rotates through the focus of the blue laser light (not illustrated) the beam paths are in principle the same as in the "red conversion phase" illustrated in FIG. 1b. A separate pictorial illustration for the "green conversion phase" is therefore omitted here.

In any case the reflection light coming from the deflection light path temporarily sequentially and the different-colored conversion light coming from the conversion light path are guided toward one another with the aid of the deflection optical unit 9, 10 and the second dichroic mirror 11 and are directed into the optical integrator 14 via the second collecting optical unit 13.

It goes without saying that the color phosphors mentioned in this exemplary embodiment are provided merely by way of example and in this case together with the blue reflection light for a sequence of red, green, blue light, etc. It is also possible to use further color phosphors, for example yellow phosphor, or else other color phosphors, for example yellow instead of red phosphor, in combination with a suitable red filter for generating red light.

Figure 2:
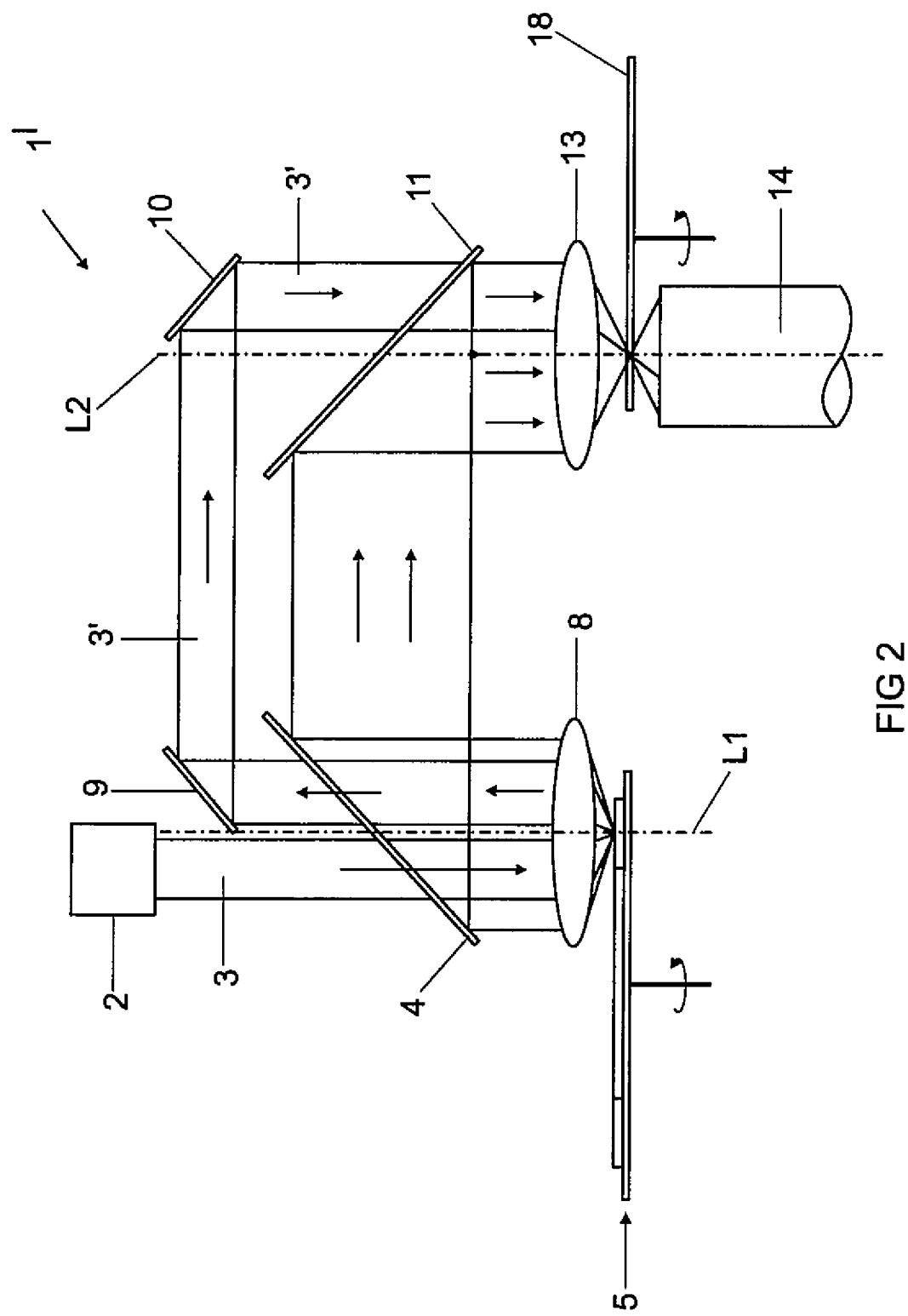
FIG. 2 shows a further exemplary embodiment of a lighting device according to the invention with phosphor wheel.

FIG. 2 shows a schematic illustration of a variant $1^I$ of the lighting device 1 from FIGS. 1a, 1b. For the sake of simplicity the beam paths of the reflection and conversion phases are depicted simultaneously here, even though the latter occur temporarily sequentially as in FIGS. 1a, 1b. The sole significant difference relative to the lighting device 1 illustrated in FIGS. 1a, 1b is that here the second deflection mirror 10 is not adjusted on-axis. Rather, the second deflection mirror 10 is displaced such that the blue laser light beam 3' is incident on the collecting optical unit 13 parallel and displaced with respect to the optical axis L2 (off-axis beam path). This enables on the focus side a partial angular adaptation of the blue laser light beam and the conversion light beam upon being radiated into the optical integrator, and hence improved mixing. This also affords the possibility of reducing the length of the optical integrator 14 with the degree of homogenization remaining the same. Here as well a diffusely scattering element (diffuser) can optionally additionally be arranged between the two deflection mirrors 9, 10 in order to improve the mixing of the light portions in the near field and to suppress coherence effects (speckle) of the reflection light (reflected non-converted excitation light).

Figure 3:
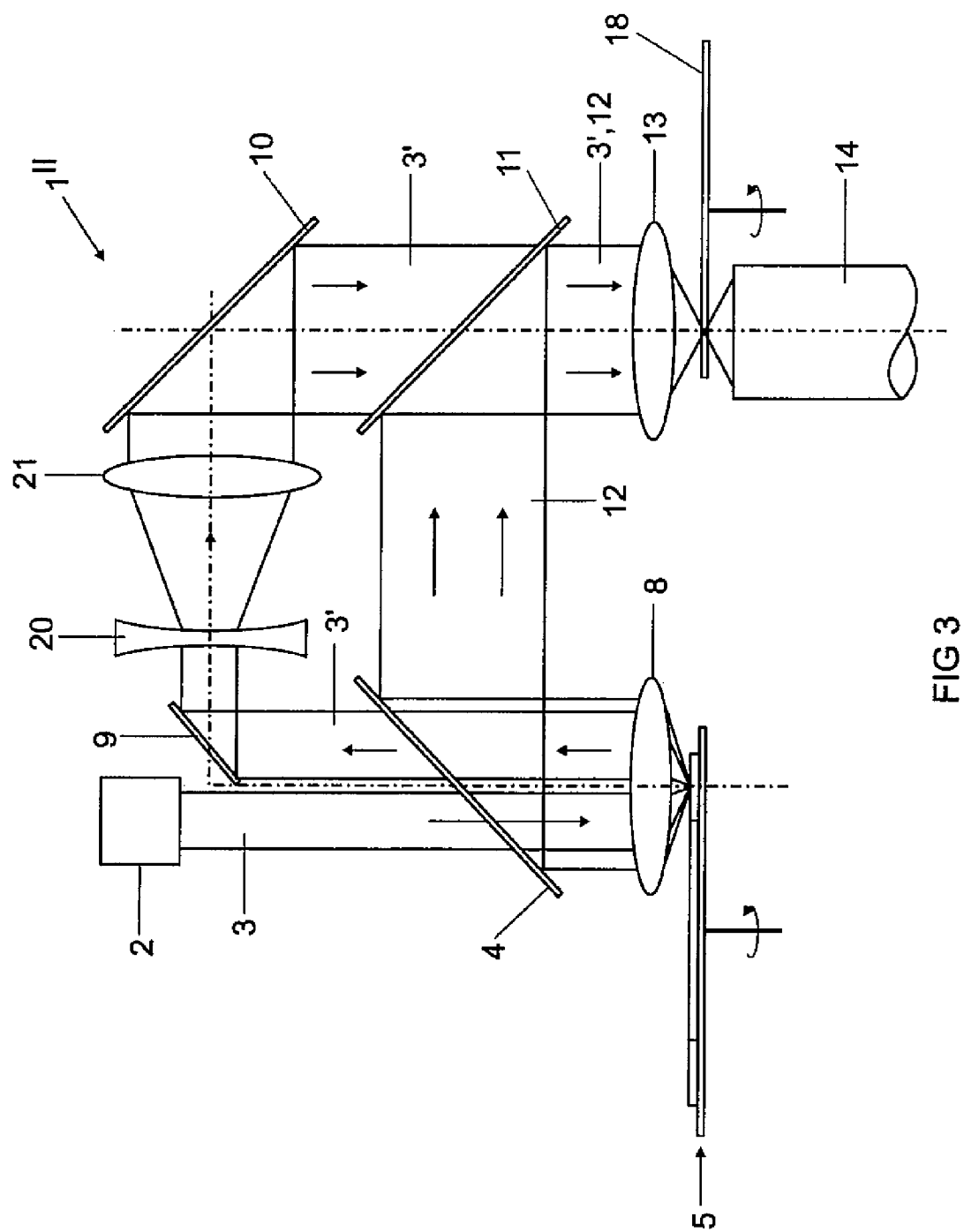
FIG. 3 shows one exemplary embodiment of a lighting device according to the invention with phosphor wheel and telescope.

FIG. 3 shows a schematic illustration of a further variant $1^{II}$ of the lighting device 1 from FIGS. 1a, 1b. Here a magnifying lens telescope comprising the two lenses 20, 21 is arranged between the two deflection mirrors. The lens telescope 20, 21 serves to expand the blue reflection light beam 3' to the diameter of the conversion light beam 12. After the superimposition of the expanded blue laser light (reflection light) 3' and the converted light 12 with the aid of the second dichroic mirror 11, they impinge on the filter wheel 18 and the optical integrator 14 with a similar angular distribution. This improves the mixing of the color light portions and makes it possible to shorten the length of the optical integrator 14 with the degree of homogenization remaining the same. In particular, this results in improved intermixing in the far field.

Figure 4:
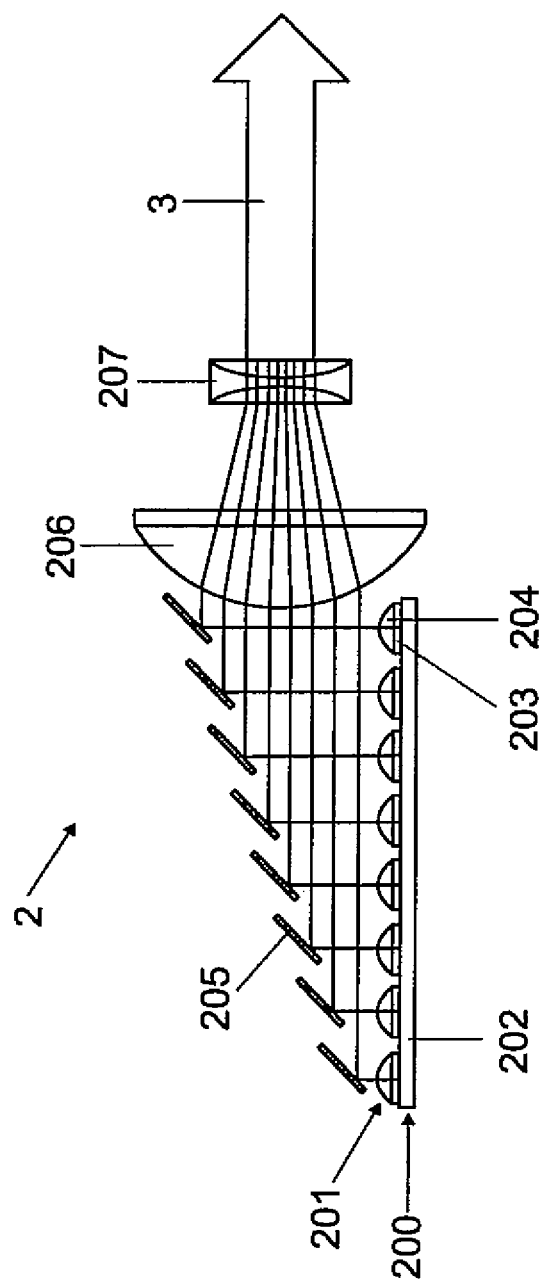
FIG. 4 shows one embodiment of an excitation light source for a lighting device according to the invention.

FIG. 4 shows a schematic illustration of one possible embodiment of the excitation light source 2, merely indicated symbolically in the previous exemplary embodiments of the invention. In this case, the excitation light source 2 comprises a light source 200 embodied as a laser diode matrix, said light source comprising a plurality of laser diodes 201. In this case, the arrangement of the laser diodes 201 extends not only in a row, as discernible in FIG. 5, but also in a matrix-like fashion into the plane of the drawing. For this purpose, the individual laser diodes 201 are arranged on a common carrier plate 202. Each laser diode 201 is provided with a primary lens 204. The primary lenses 204 each serve for collimating the laser radiation emitted by the associated chip 203. Alternatively, instead of the individual primary lenses 204, an integral lens matrix ("multi-lens array") can also be provided, in which a corresponding collimation lens is integrated for each chip (not illustrated). The collimated laser beams of the individual laser diodes 201 are deflected in a common direction perpendicular to the emission direction of the laser diodes 201 with the aid of elongate mirror elements 205 arranged in a staircase-like fashion. As a result, the spatial extent of the laser beam bundle is compressed in the axis of the laser diode matrix 200 that lies in the plane of the drawing. A further compression of the laser beam bundle is carried out by the collecting lens 206 disposed downstream. The concave lens system 207 that then follows generates a collimated laser beam bundle 3 symbolized by the wide arrow. The lenses 206 and 207 therefore form a telescope.

Figure 5:
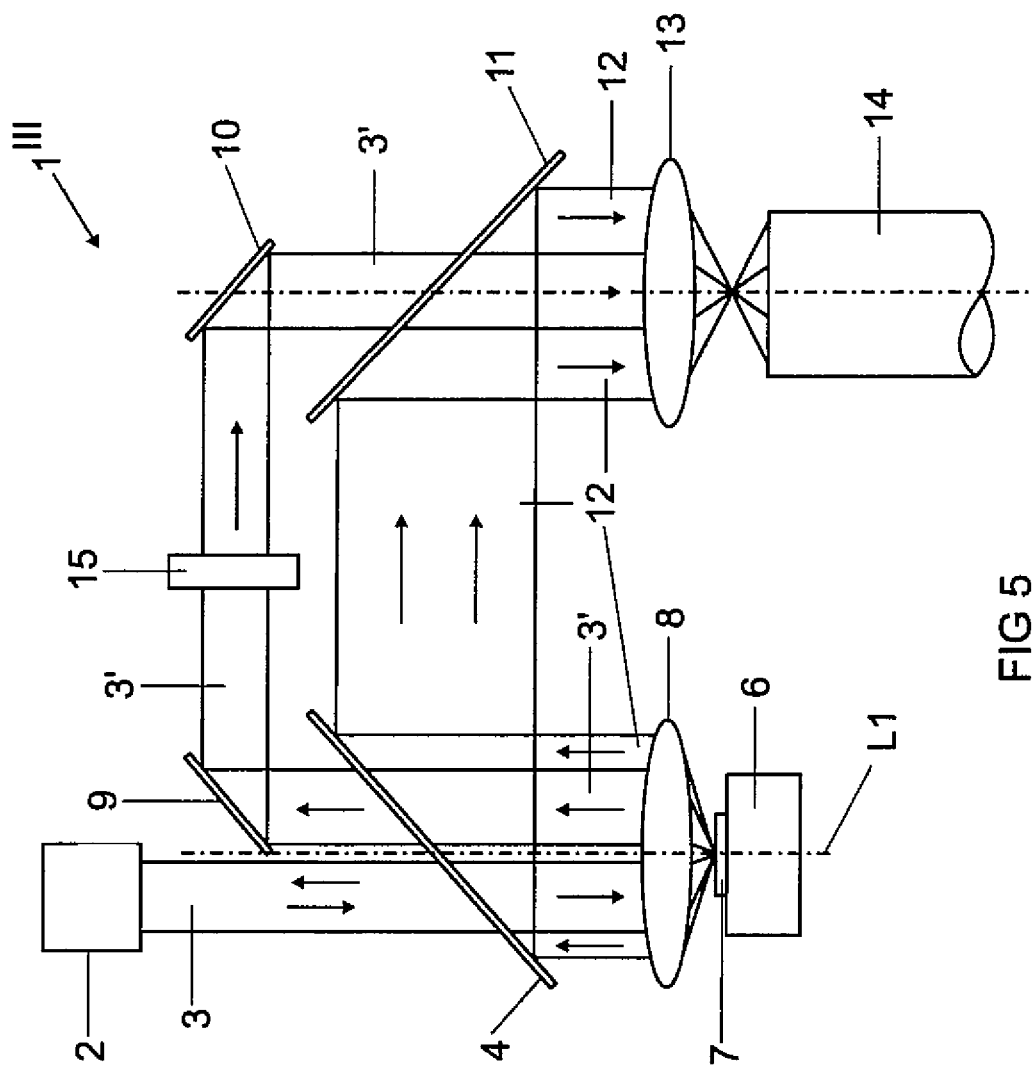
FIG. 5 shows one exemplary embodiment of a lighting device according to the invention with static wavelength conversion arrangement.

FIG. 5 shows a schematic illustration of a lighting device $\mathbf{1}^{III}$ in accordance with one exemplary embodiment of the invention. Here the wavelength conversion arrangement is embodied in a static fashion. Therefore, a synchronized filter wheel is also omitted here. The rest of the construction corresponds to that of the lighting device 1 shown in FIGS. 1a, 1b. The preferably at least approximately collimated blue laser light 3 from the excitation light source 2 is directed through a first dichroic mirror 4 onto a wavelength conversion arrangement, which is embodied as a phosphor layer 7 arranged on a static carrier 6. The carrier 6 is shaped as a metallic parallelepiped and also serves as a heat sink for dissipating the heat loss arising upon the irradiation of the phosphor layer 7. The phosphor layer 7 facing the excitation light source 2 comprises a yellow phosphor, e.g. Ce:YAG, and is purposefully designed for a partial conversion of the blue laser light 3 into conversion light in the yellow spectral range and a residual reflection of the unconverted blue laser light 3. Depending on the application, the proportions of conversion and reflection can be chosen in accordance with the luminous flux respectively desired in the two colored channels yellow and blue. In particular, the proportions can also be chosen in accordance with white mixed light having a desired color temperature. The respective proportion of blue laser light reflected in an unconverted fashion and converted yellow light can be controlled for example by the reflectivity of the phosphor layer. Alternatively or additionally, the phosphor layer can also be perforated, for example with a continuous hole grid in the phosphor, through which the excitation laser beam can impinge on the carrier surface without conversion, in order thus to increase the proportion that is reflected in an unconverted fashion. For this purpose, in a supporting manner, the carrier can be embodied as at least partly reflective.

That portion 3' of the incident blue laser light 3 which is reflected in an unconverted fashion by the phosphor layer 7 (symbolized by an opposite arrow) is directed back in a collimated fashion by the first collecting optical unit 8 in a manner mirror-inverted with respect to the incident blue laser light 3 and passes through the first dichroic mirror 4. The blue laser light 3' is then directed onto a second dichroic mirror 11 via a deflection optical unit consisting of two deflection mirrors 9, 10, said second dichroic mirror being designed as transparent to the blue laser light 3' in the same way as the first dichroic mirror 4.

That portion of the focused blue laser light 3 which is converted into yellow conversion light 12 by the phosphor layer 7 is collected by the first collecting optical unit 8 and directed onto the first dichroic mirror 4, from where the conversion light 12 is spectrally reflected onto the second dichroic mirror 11, which is designed as reflective for the conversion light 12 like the first dichroic mirror 4.

The yellow conversion light 12 reflected by the second dichroic mirror 11 and the transmitted blue laser light 3' pass collinearly to a second collecting optical unit 13. The second collecting lens 13 focuses the two yellow and blue light portions into an elongate optical integrator 14 (only partly illustrated).

The lighting device $\mathbf{1}^{III}$ is suitable for example as a white light source in an automobile headlight or endoscope.

Figure 6:
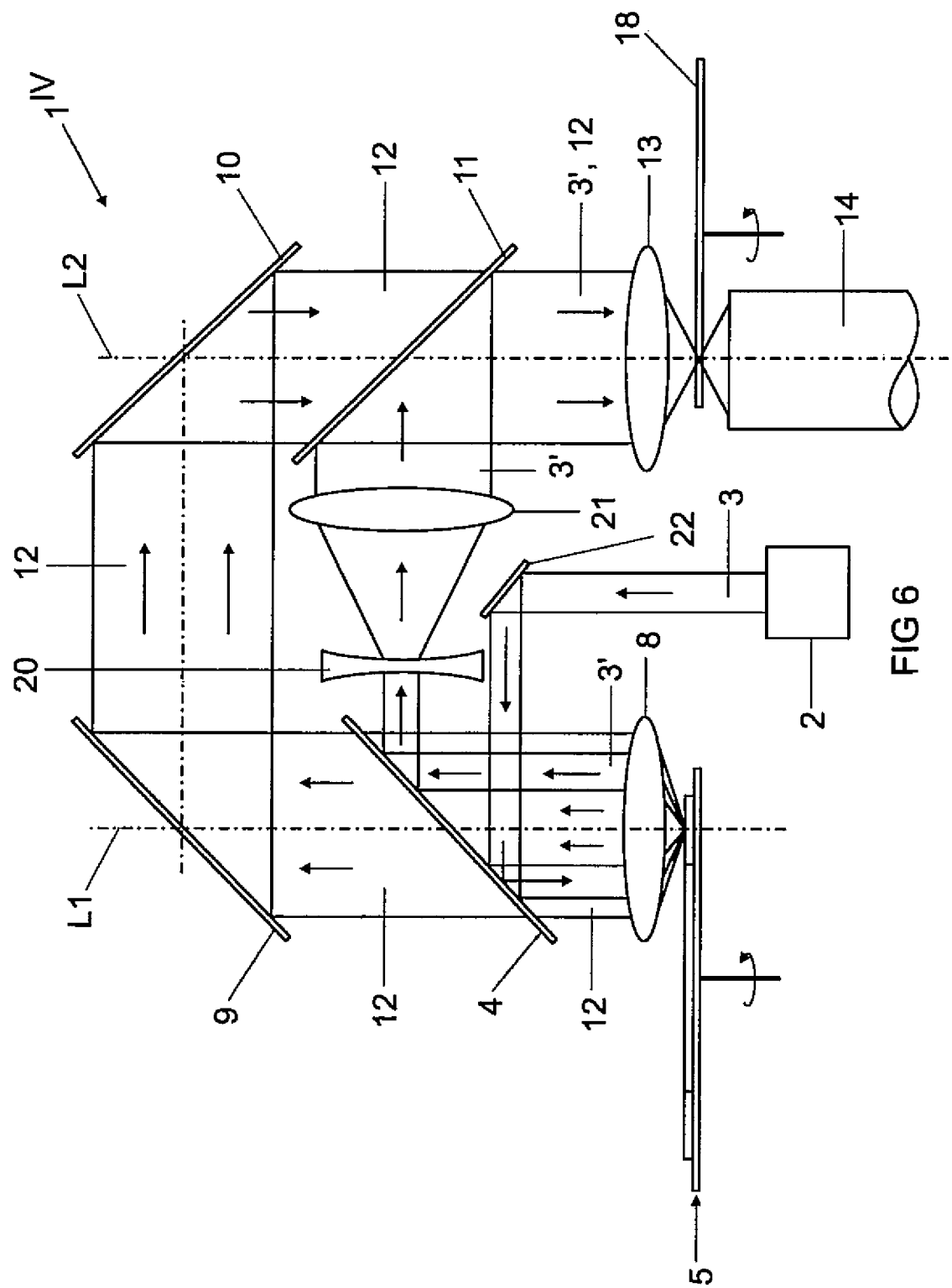
FIG. 6 shows a variant of the exemplary embodiment shown in FIG. 3 with interchanged reflection and conversion light paths.

FIG. 6 shows a schematic illustration of a variant $\mathbf{1}^{IV}$ of the lighting device $\mathbf{1}^{II}$ from FIG. 3. Here the two dichroic mirrors 4, 11 are reflectively coated in a manner opposite to that in FIG. 3, mainly as reflective for the blue excitation light 3 and transmissive for the conversion light 12. As a result, reflection light path and conversion light path are also interchanged relative to one another. Therefore, the magnifying telescope 20, 21 is not arranged in the deflection light path, but rather optically between the two dichroic mirrors 4, 11 which reflect the reflection light 3'. Moreover, the excitation light 3 is reflected onto the phosphor wheel 5 via the first dichroic mirror 4, instead of being transmitted onto the phosphor wheel 5 as in FIG. 3. For this purpose, the excitation light 3 is spectrally reflected laterally onto the first dichroic mirror 4 via a deflection mirror 22. By contrast, the conversion light 12 transmits through the first dichroic mirror 4 and is guided onto the deflection light path by means of the two deflection mirrors 9, 10. The reflection light 3' coming from the reflection light path and the conversion light 12 from the deflection light path are combined with the aid of the second dichroic mirror 11. Downstream of the second dichroic mirror 11, both the light beam path of reflection light 3' and conversion light 12 and the further construction are then totally the same as in FIG. 3.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A lighting device for generating light with a wavelength conversion arrangement, comprising:
   an excitation light source configured to emit excitation light;
   a wavelength conversion arrangement having at least one wavelength conversion element,
      wherein the wavelength conversion arrangement is arranged in an excitation light path,
      wherein the at least one wavelength conversion element is adapted to at least partly convert the excitation light radiated onto the wavelength conversion element from the excitation light source into conversion light and reflect the conversion light into the same half-space in which the excitation light is incident on the surface of the wavelength conversion element, and
      wherein the wavelength conversion arrangement is adapted to reflect the excitation light radiated onto the wavelength conversion arrangement from the excitation light source at least occasionally and at least partly in an unconverted fashion as reflection light;
   a first dichroic mirror arranged and adapted to guide the reflection light onto a reflection light path and the conversion light onto a conversion light path, wherein the reflection light path and the conversion light path are at least partly spatially separated; and
   a beam combining arrangement configured for combining the reflection light coming from the reflection light path and the conversion light coming from the conversion light path,
   wherein the beam combining arrangement comprises a second dichroic mirror and is configured to reflect the light reflected by the first dichroic mirror and to transmit the light transmitted by the first dichroic mirror.

2. The lighting device of claim 1, wherein the beam combining arrangement comprises a deflection optical unit having two deflection mirrors spaced apart from one another, which is arranged in the light path of the light transmitted by the first dichroic mirror and is adapted to deflect the light transmitted by the first dichroic mirror onto the second dichroic mirror.

3. The lighting device of claim 2, further comprising an optical diffuser arranged between the two deflection mirrors.

4. The lighting device of claim 2, further comprising an optical telescope arranged between the two deflection mirrors, said optical telescope being adapted for expanding the reflection light beam.

5. The lighting device of claim 1, wherein the wavelength conversion arrangement further comprises a carrier which at least partly reflects the excitation light.

6. The lighting device of claim 1, wherein the at least one wavelength conversion element is embodied as a phosphor layer on the carrier.

7. The lighting device of claim 1,
   wherein the wavelength conversion arrangement comprises at least one reflection element which at least partly reflects the excitation light, and
   wherein the wavelength conversion arrangement is configured so that the excitation light is radiated onto the reflection element or the wavelength conversion element temporarily sequentially.

8. The lighting device of claim 7,
   wherein the wavelength conversion arrangement is embodied as a phosphor wheel rotatable about a rotation axis of the phosphor wheel, and
   wherein the at least one wavelength conversion element is arranged at least in a segment of a ring-shaped region of the phosphor wheel that extends around the rotation axis of the phosphor wheel.

9. The lighting device of claim 7, wherein the at least one reflection element is arranged at least in a segment of a ring-shaped region of the phosphor wheel that extends around the rotation axis of the phosphor wheel.

10. The lighting device of claim 1, wherein the beam combining arrangement comprises a first collecting optical unit arranged optically between the excitation light source and the wavelength conversion arrangement, wherein the first collecting optical unit is configured firstly to focus the excitation light from the excitation light source onto the wavelength conversion arrangement and secondly to collect and collimate the conversion light reflected by the wavelength conversion arrangement or the reflection light reflected in an unconverted fashion by the wavelength conversion arrangement.

11. The lighting device of claim 10, which is adapted so that the excitation light is radiated onto the first collecting optical unit parallel and offset with respect to an optical axis of the first collecting optical unit.

12. The lighting device of claim 10, wherein the beam combining arrangement further comprises:
   a second dichroic mirror configured to reflect the light reflected by the first dichroic mirror and to transmit the light transmitted by the first dichroic mirror, and
   a second collecting optical unit arranged optically downstream of the second dichroic mirror.

13. The lighting device of claim 12, wherein the beam combining arrangement further comprises an optical integrator arranged optically downstream of the second collecting optical unit and serving for feeding in the conversion light and the reflection light.

14. The lighting device of claim 12, which is adapted so that the reflection light can be radiated onto the second collecting optical unit parallel and offset with respect to the optical axis of the second collecting optical unit.

* * * * *